(12) United States Patent
Kim

(10) Patent No.: US 9,888,678 B1
(45) Date of Patent: Feb. 13, 2018

(54) KICK LEVER ASSEMBLY FOR BAIT CAST REEL

(71) Applicant: W.C. Bradley/Zebco Holdings, Inc., Tulsa, OK (US)

(72) Inventor: Hyunkyu Kim, Broken Arrow, OK (US)

(73) Assignee: W.C. Bradley/Zebco Holdings, Inc., Tulsa, OK (US)

( * ) Notice: Subject to any disclaimer, the term of this patent is extended or adjusted under 35 U.S.C. 154(b) by 254 days.

(21) Appl. No.: 14/698,423

(22) Filed: Apr. 28, 2015

(51) Int. Cl.
*A01K 89/01* (2006.01)
*A01K 89/015* (2006.01)

(52) U.S. Cl.
CPC ................... *A01K 89/0189* (2015.05)

(58) Field of Classification Search
CPC .............. A01K 89/015; A01K 89/0186; A01K 89/01901
See application file for complete search history.

(56) References Cited

U.S. PATENT DOCUMENTS

| | | | |
|---|---|---|---|
| 4,406,427 A * | 9/1983 | Murakami | A01K 89/015 242/261 |
| 4,650,134 A | 3/1987 | Councilman | |
| 4,697,760 A * | 10/1987 | Aoki | A01K 89/015 192/93 A |
| 4,850,550 A * | 7/1989 | Aoki | A01K 89/015 242/261 |
| 4,919,360 A | 4/1990 | Roberts | |
| 5,340,053 A * | 8/1994 | Morimoto | A01K 89/015 242/261 |
| 5,344,098 A | 9/1994 | Roberts | |
| 5,799,890 A | 9/1998 | Kim | |
| 5,810,273 A * | 9/1998 | Carpenter | A01K 89/015 242/261 |
| 6,003,801 A * | 12/1999 | Kobayashi | A01K 89/015 242/310 |
| 6,189,822 B1 * | 2/2001 | Ikuta | A01K 89/033 242/257 |
| 6,286,772 B1 | 9/2001 | Koelewyn | |
| 2002/0033426 A1 * | 3/2002 | Kitajima | A01K 89/015 242/261 |
| 2013/0193250 A1 * | 8/2013 | Ikebukuro | A01K 89/015 242/261 |

* cited by examiner

*Primary Examiner* — Emmanuel M Marcelo
(74) *Attorney, Agent, or Firm* — Gable Gotwals

(57) ABSTRACT

A fishing reel includes a frame and a crank shaft mounted to the frame. A kick lever is provided for selective engagement with teeth of a ratchet element keyed to the crank shaft. The kick lever selectively engages the ratchet element to place the reel in one of a cast state and a retrieve state. In one embodiment, the kick lever defines a base portion, a support post, a tooth engaging post and a horizontal reinforcing member that define a window. The window receives an attachment member that slidably secures the kick lever and prevents the kick lever from vertical movement during heavy loads. The unique design of the kick lever prevents the kick lever from moving in undesired directions, thereby ensuring that smooth performance of the reel and prevention of jamming of the mechanism.

15 Claims, 6 Drawing Sheets

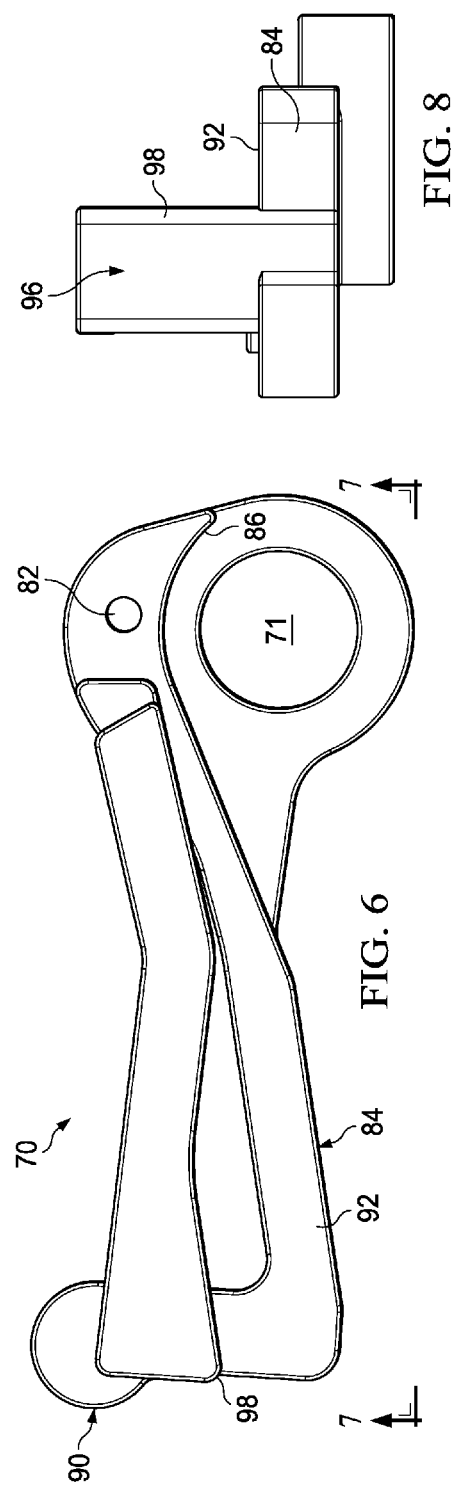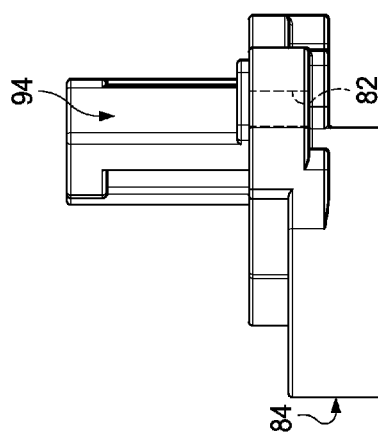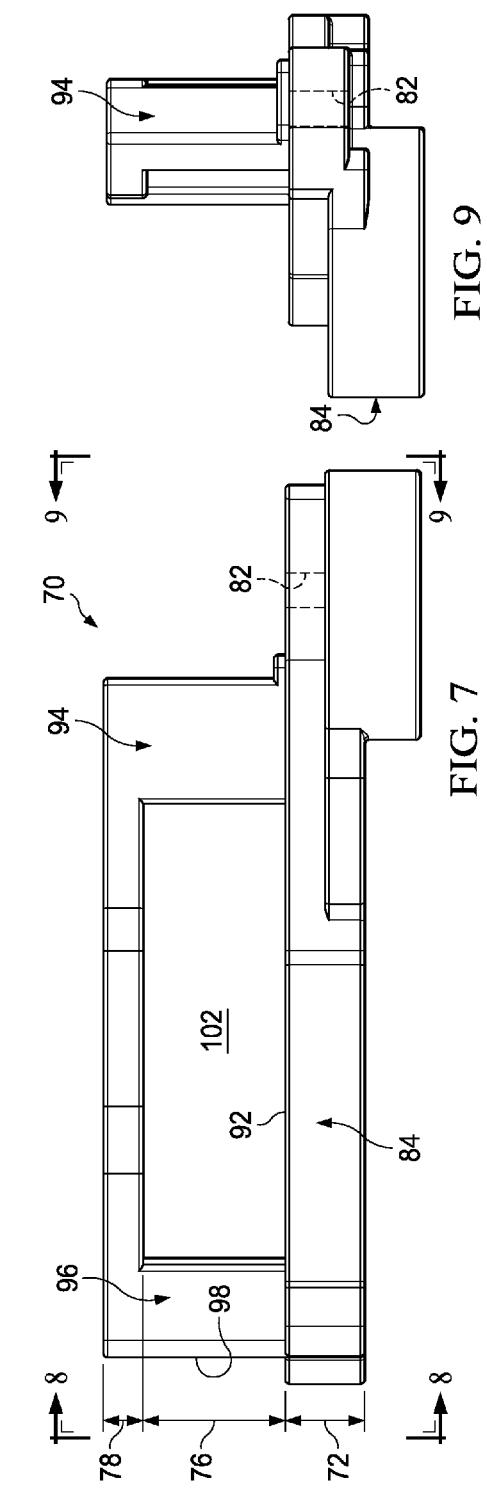

KICK LEVER ASSEMBLY FOR BAIT CAST REEL

FIELD OF THE INVENTION

The present invention generally relates to fishing reels and, more particularly, to a kick lever assembly for bait cast fishing reels.

BACKGROUND OF THE INVENTION

In a conventional bait cast fishing reel, line carrying spool is rotatable by an external crank handle. A thumb button is depressed to cast or pay out line. The thumb button disengages the spool from a crank handle while allowing the spool to freely rotate as line pays out of the spool.

In prior art mechanisms, a movable slider is manipulated by an external thumb button. The slider may be positioned in either a first or retrieve position or the slider may be positioned in a second or cast position. As the slider is repositioned from the first position into the second position, the slider moves a yoke axially relative to the line carrying spool. As the yoke is moved, a pinion gear, which normally transmits a torque from a crank shaft to the line carrying spool, is disengaged. Simultaneously, a kick lever, which is pivotably connected to the slider, is repositioned so that the kick lever is engaged with teeth on a ratchet element that is associated with the crank shaft. An overcenter spring biases the kick lever into engagement with the ratchet teeth and thereby prevents reverse rotation of the crank shaft. Forward rotation of the crank shaft repositions the kick lever such that an overcenter spring associated therewith drives the kick lever and the slider on which it is mounted, to cause the slider to move from the second or cast position back to the first or retrieve position.

In prior art devices, the kick lever connects to the slider through a pin and conforming slot arrangement. Upon depression of the thumb button, the kick lever engages teeth of a ratchet element if the kick lever is received between adjacent teeth, then the reel will be changed to the cast state without any problem. However, in the event that the kick lever aligns with one of the ratchet teeth in transition between the retrieve and cast states, the kick lever will be prohibited from moving through its full range. In this case, the kick lever will block movement of the slider into the second position, thereby preventing full disengagement of the pinion gear and latching of the mechanism, which will maintain the reel in a cast state. One problem with prior art devices is that forces on the kick lever upon engagement with the ratchet element may cause the kick lever to bend out of contact with ratchet teeth, i.e., the kick lever may tilt outwardly and not be able to perform its function of preventing rotation of the crank shaft.

Heretofore, this problem has been dealt with by simply turning the crank handle after jamming occurs. The crank handle is turned sufficiently such that the projection on the kick lever can move between the teeth. This is an inconvenience to the user. Further, a user that does not recognize that a slight turning of the crank handle can alleviate the jamming problem may be inclined to exert a large force on the thumb button, thereby stressing the parts of the reel mechanism and potentially causing reel failure.

SUMMARY OF THE INVENTION

A fishing reel of the invention includes a frame and a crank shaft mounted to the frame. A ratchet element that defines a plurality of teeth is keyed to the crank shaft. A kick lever is provided for selective engagement with the ratchet element teeth. When the kick lever is engaged with the ratchet element, the reel is in a cast state. When the kick lever is disengaged with the ratchet element, the reel is in a retrieve state.

The kick lever defines a base portion having an upper surface and a tooth engagement surface extending upwardly from a second end of the of the base portion. In one embodiment, the kick lever further comprises horizontal reinforcing member extending from a support post to the tooth engaging post. In one embodiment, the base portion, the post, the tooth engaging post and the horizontal reinforcing member define a window that receives an attachment member that passes through the window for slidably securing the kick lever and for preventing the kick lever from vertical movement during heavy loads.

The tooth engaging post defines a tooth engaging surface. The tooth engagement surface selectively engages one of the plurality of teeth of the ratchet element. The attachment member is affixed to the frame and slidably engages the upper surface of the base portion of the kick lever. The kick lever is actuated by a slider that is movably affixed to the frame. The kick lever defines a kick lever orifice for receiving one end of an overcenter spring. A thumb button has a first end that is in communication with the slider for selectively positioning the slider. An external crank handle is affixed to the crank shaft. The external crank handle rotates about an axis of the crank shaft.

By pressing the thumb button, the slider rotates about a laterally projecting shaft and moves the kick lever from a disengaged position to an engaged position where the kick lever engages the trip ratchet. By rotating the crank shaft with the crank handle, the trip ratchet moves the kick lever to the disengaged position as the gears engaged by turning the crank handle release the slider to an original position.

The unique design of the kick lever allows movement of the kick lever to be restrained to only desired directions, thereby ensuring that smooth performance of the reel and prevention of jamming of the mechanism.

BRIEF DESCRIPTION OF THE DRAWINGS

FIG. 6 is a plan view of the kick lever of FIGS. 2-5;

FIG. 7 is an elevation view of the kick lever assembly of FIG. 2-6;

FIG. 8 is an end view of the kick lever of FIGS. 2-7 taken along lines 8-8 of FIG. 7;

FIG. 9 is an end view of the kick lever of FIGS. 2-7 taken along lines 9-9 of FIG. 7.

DETAILED DESCRIPTION OF THE PREFERRED EMBODIMENTS

Figure 1:
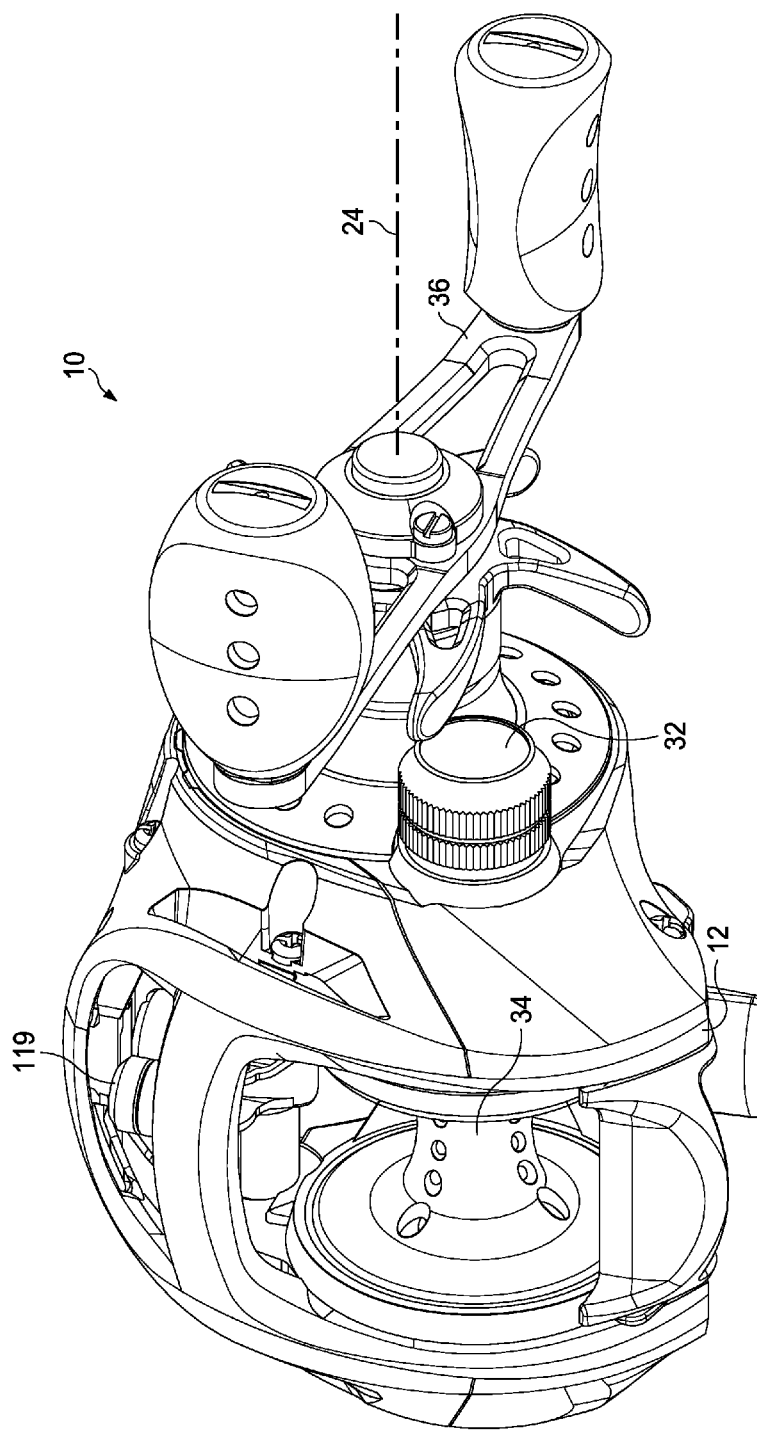
FIG. 1 is a perspective view of an assembled reel of the invention.

Referring to FIGS. 1-4, a fishing reel is designated generally 10. Fishing reel 10 includes frame 12. Frame 12 defines kick lever receptacle 14 (FIG. 3) raised plate mount 16 (FIG. 2, 3), guide ridge 18, and stop ridge 20.

Figure 2:
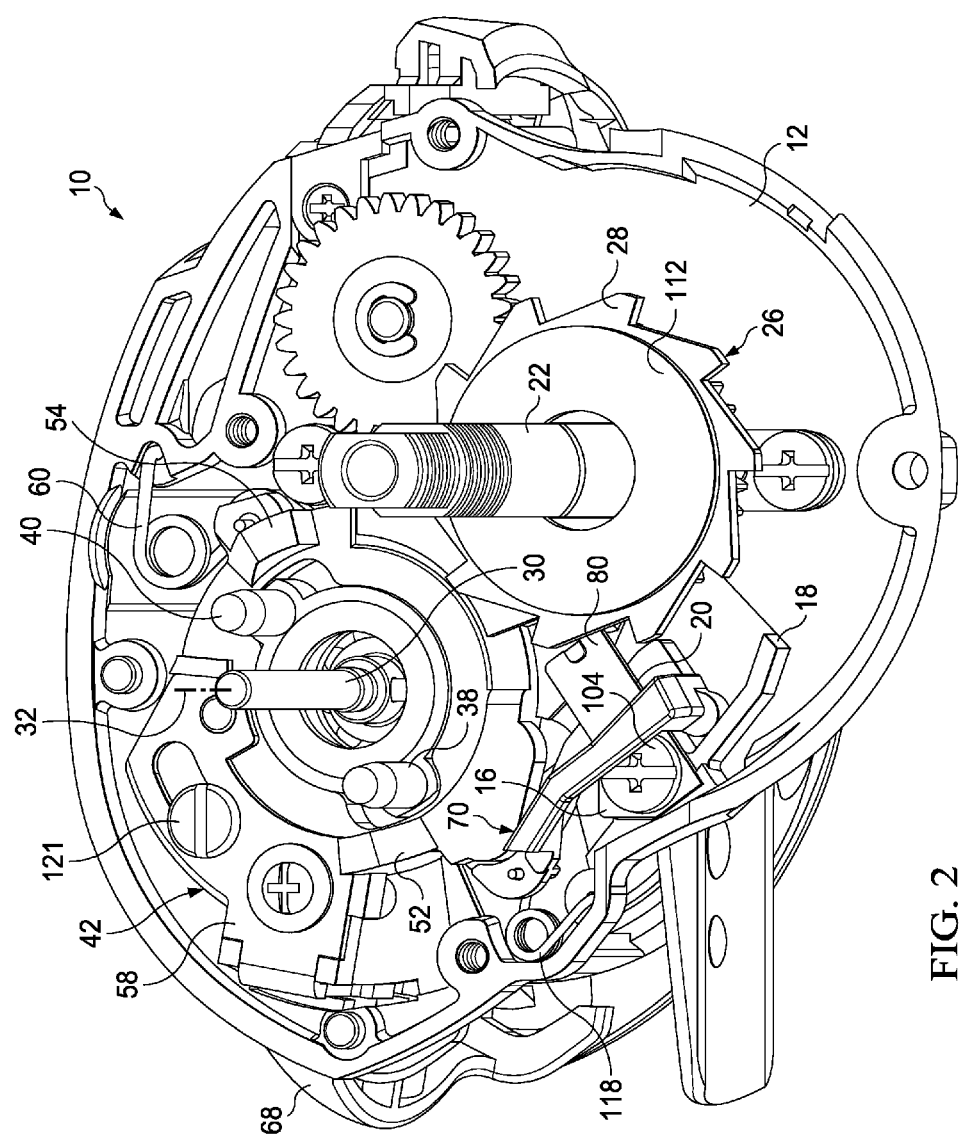
FIG. 2 is a perspective view of a partially disassembled reel showing the kick lever assembly of the present invention.
Figure 3:
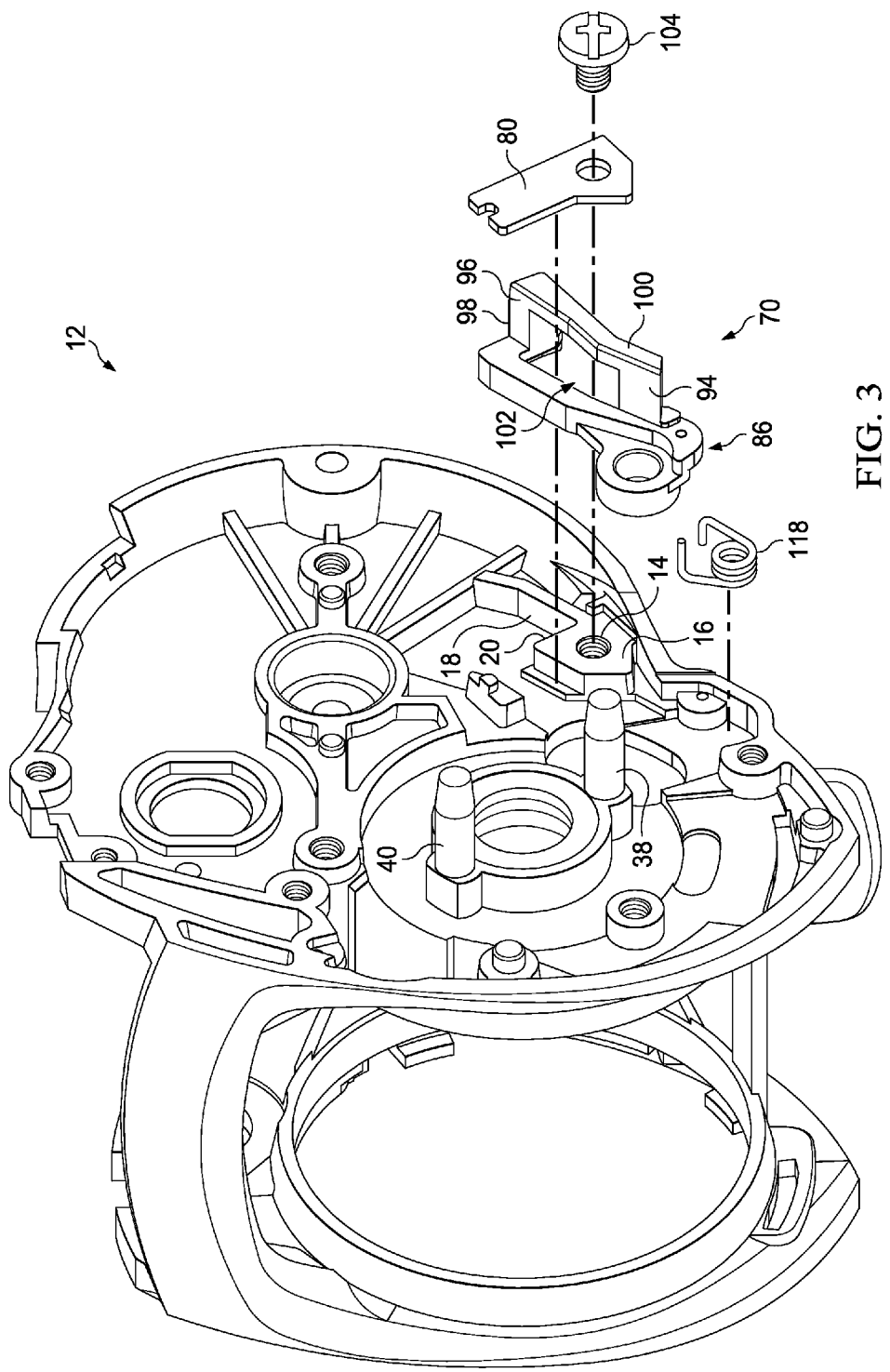
FIG. 3 is an exploded view of the kick lever assembly of the reel of FIGS. 1 and 2.
Figure 4:
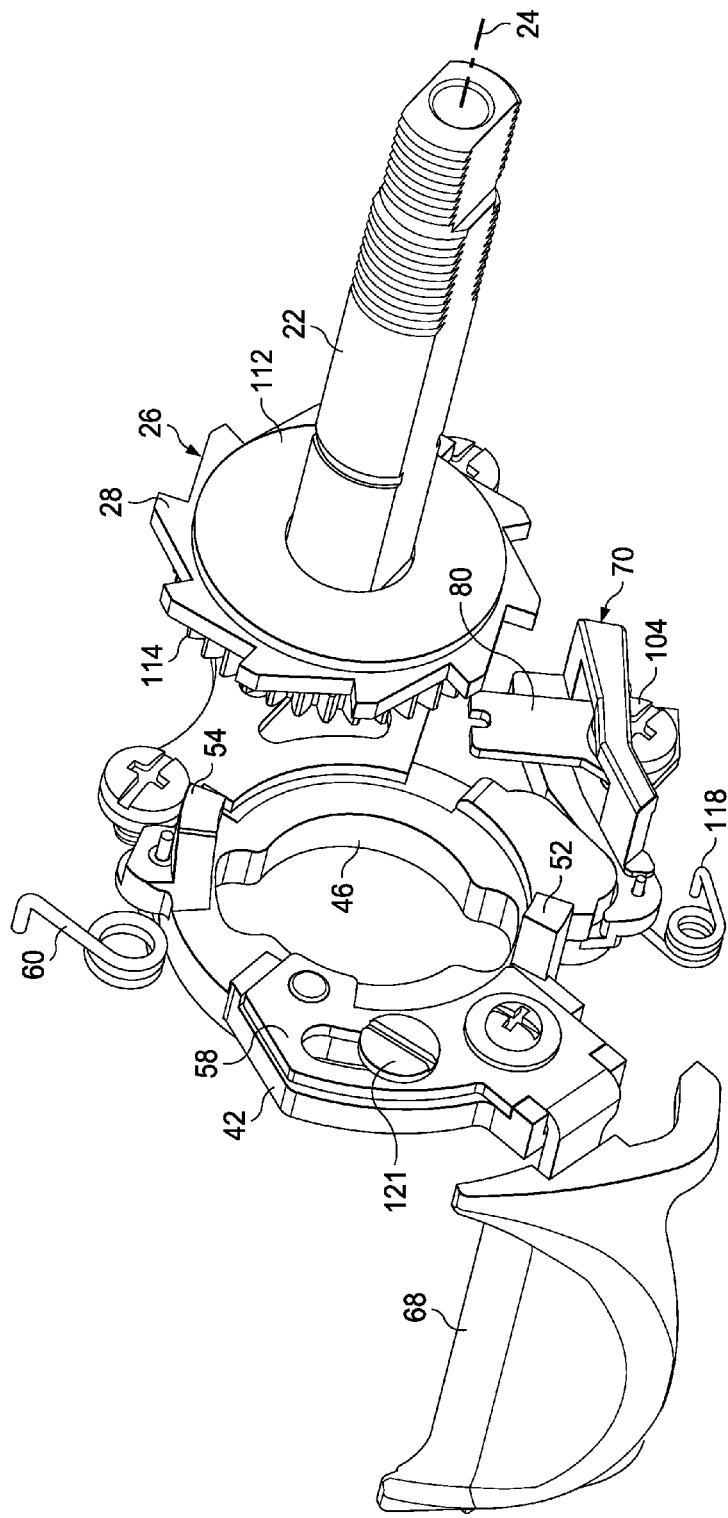
FIG. 4 is a perspective view of the kick lever assembly of FIG. 1.

Crank shaft 22 (FIGS. 2, 4, 5) is mounted to frame 12. Crank shaft 22 defines axis 24 (FIGS. 1, 2, 4). Ratchet element 26 (FIGS. 2, 4, 5) is keyed to crank shaft 22. Ratchet element 26 defines a plurality of teeth 28.

Spool shaft 30 (FIG. 2) projects from frame 12. Spool shaft 30 defines laterally extending axis 32. Line carrying spool 34 (FIG. 1) is mounted on spool shaft 30 (FIG. 2) for rotation about laterally extending axis 32. External crank handle 36 (FIG. 1) engages crank shaft 22. External crank handle 36 is rotatable about axis 24. Crank handle 36 is keyed to crank shaft 22. Ratchet element 26 is also keyed to crank shaft 22 for following rotation of crank shaft 22 about axis 24.

A first yoke post 38 and a second yoke post 40 (FIGS. 2, 3) extend substantially perpendicularly from frame 12.

Figure 5:
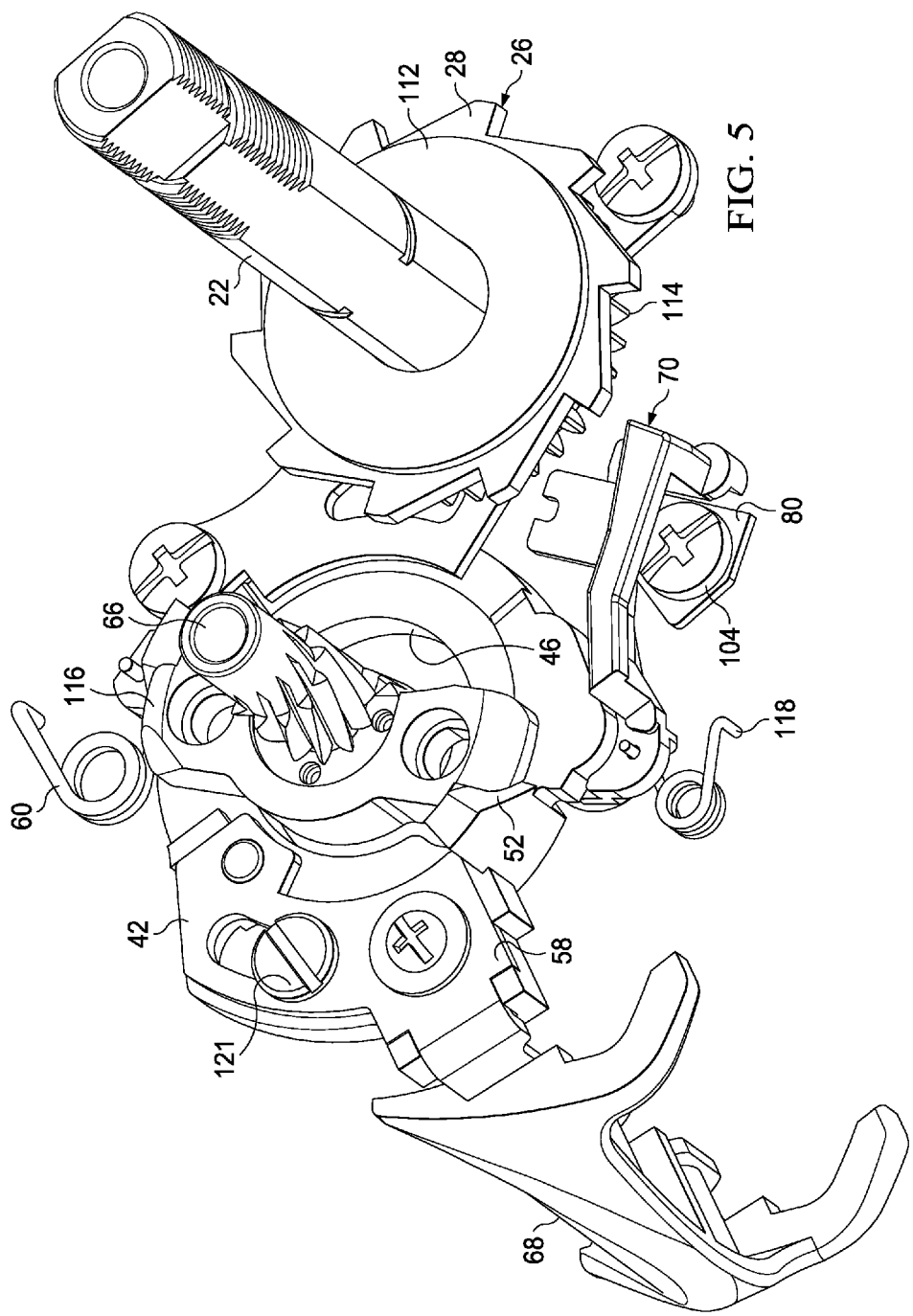
FIG. 5 is a perspective view of the kick lever assembly of FIG. 1 showing gears disengaged and the kick lever in a position to start reengage.

Slider 42 (FIGS. 2, 4, 5) is slidably mounted on frame 12. Slider 42 defines a screw cut out, a main cutout, a first slot, a second slot, and spaced cam ramps for cam surfaces 52 and 54. The first slot and the second slot accommodate a structure from which first yoke post 38 and second yoke post 40 protrude. The structure limits pivoting movement of slider 42 about laterally extending axis 32 defined by projecting spool shaft 30 wherein the first slot and the second slot are contiguous with main cutout 46 (FIG. 4). Main cutout 46 accommodates spool shaft 30 projecting from frame 12. Substantially flat body 58 (FIGS. 2, 4, 5) is affixed to slider 42. Slider 42 is normally biased towards a first position by formed wire spring 60 (FIGS. 2, 4, 5). Spring 60 is preferably coiled and has a first arm that engages frame 12 and a second arm and that engages slider 42.

Pinion gear 66 (FIG. 5) is received on spool shaft 30. External thumb button 68 (FIGS. 4, 5) is provided for selectively manipulating slider 42. External thumb button 68 is attached to slider 42 via substantially flat body 58.

Kick lever 70 is affixed to slider 42 via pivot orifice 71 for selective engagement with ratchet element 26. Kick lever 70 preferably has a first level 72, second level 76 and third level 78 (best seen in FIGS. 6-8).

Referring now primarily to FIGS. 6-8, attachment member 80 (FIGS. 2, 3, 5) is affixed to raised plate mount 16 (FIGS. 2, 3) of frame 12 for guiding kick lever 70. Kick lever 70 defines kick lever orifice 82. First level 72 of kick lever 70 includes base portion 84 which is slidably positioned between frame 12 and attachment member 80, i.e., beneath attachment member 80. Base portion 84 has a first end 86 with a glide surface defined thereon. Base portion 84 additionally has a second end 88 defining a stop surface 90. Base portion 84 includes window framing surface 92 on upper surface of base portion 84. Second level 76 includes first post 94 and second post 96. Second post 96 defines tooth engaging surface 98. Third level 78 includes horizontal reinforcing member 100 for reinforcing first post 94 and second post 96. Window framing surface 92, first post 94, second post 96 and reinforcing member 100 define window 102.

Attachment member 80 is affixed to frame 12 by screw 104. Attachment member 80 passes through window 102 for securing base portion 84 of kick lever 70 to ensure that kick lever 70 can slide laterally but is restricted from moving vertically. Therefore, kick lever 80 is maintained in an optimal orientation with respect to frame 12 so that tooth engagement surface 99 is maintained in a position to effec-tively engage teeth 28 and ratchet element 26, over when larger forces are applied to the ratchet element 26/kick lever 70 interface.

Kick lever 42 effectively floats between an engaged position (e.g., shown in FIG. 5) and a disengaged position.

For purposes of this application, an actuating mechanism is comprised of external thumb button 68, slider 42, ratchet element 26 and kick lever 70.

Plurality of washers 112 (FIGS. 2, 4, 5) are located on crank shaft 22 adjacent to ratchet element 26. Main drive gear 114 (FIGS. 4, 5) is carried by crank shaft 22. Main drive gear 114 is provided for following rotation of crank shaft 22 through frictional forces developed between crank shaft 22 and main drive gear 114 by washers 112. Main drive gear 114 engages pinion gear 66 which is carried on laterally projecting spool shaft 30.

Yoke 116 (FIG. 5) is mounted to slide guidingly on first yoke post 38 and second yoke post 40 between a first vertically spaced position and a second vertically spaced position. Yoke 116 is keyed to pinion gear 66 so that pinion gear 66 follows vertical movement of yoke 116. Yoke 116 is normally biased vertically downwardly with respect to frame 12 so that pinion gear 66 is keyed to spool shaft 30 for following rotation of spool shaft 30.

Overcenter spring 118 (FIGS. 2-5) communicates with kick lever 70 for driving kick lever 70 into an engaged position as slider 42 approaches a second position (e.g., shown in FIG. 5). As slider 42 approaches the second position, overcenter spring 118 causes slider 42 to be latched into the second position thereby maintaining kick lever 70 in a cast state or engaged state (shown, e.g., FIG. 5).

By turning crank handle 36, crank shaft 22 is rotated. Crank shaft 22 rotates drive gear 114 which turns pinion gear 66. Pinion gear 66 rotates line carrying spool 34 in a direction to retrieve line onto carrying spool 34. Simultaneously drive gear 114 engages with and drives a line guide gear (not shown) that is associated with a level wind guide mechanism 119 (FIG. 1) of conventional construction. Level wind guide mechanism 119 evenly distributes retrieved line over line carrying spool 34.

External thumb button 68 may be moved from a disengaged position to an engaged position. Movement of external thumb button 68 manipulates slider 42 from a first or retrieve position, shown in FIG. 2, to a second or cast position, shown in FIG. 5. As slider 42 moves between the first position and the second position, spaced ramp or cam surfaces 52 and 54 on slider 42 progressively bias yoke 106 laterally outwardly to thereby reposition pinion gear 66 from a position wherein pinion gear 66 is keyed to laterally projecting spool shaft 30 to follow spool shaft 30 to a laterally outward disengaged position wherein pinion gear 30 spin freely upon spool shaft 30, thereby allowing line carrying spool 34 to rotate without affecting movement of crank handle 36. This condition represents the cast state for the reel operating mechanism wherein line can be freely paid off of line carrying spool 34 to effect a cast.

As slider 42 moves from its first position (FIG. 2) to its second position (FIG. 5), kick lever 70 moves from a disengaged position shown in FIG. 2 to an engaged position shown in FIG. 5. In the engaged position of FIG. 5, tooth engagement surface 98 of second post 96 on kick lever 70 locates between adjacent teeth 28 disposed around the periphery of ratchet element 26 and about crank shaft axis 24.

Overcenter spring 118 is received in kick lever orifice 82 for driving kick lever 70 into an engaged position as slider 42 approaches its second position shown in FIG. 5. This arrangement causes slider 42 to be latched into the second position shown in FIG. 5 and the reel operating mechanism 100 to thereby be maintained in a cast state. Movement of slider 42 is limited in the first position and second position by an edge of each of the first slot and the second slot. Screw 121 (FIGS. 2, 4, 5) extends through the screw cutout into frame 12. Screw 121 abuts one end of the screw cutout when slider 42 is in a first position and the other end of the screw cutout when slider 42 is in a second position. Slider 42 is normally biased toward the first position by formed wire spring 60 which is preferably coiled and has a first arm that engages frame 12 and a second arm that engages slider 42.

In the first or retrieved position as shown in FIG. 2, overcenter spring 118 exerts a force on kick lever 70 to urge slider 42 towards the first or retrieved position of FIG. 2, thereby augmenting the biased force developed by formed wire spring 60. Once slider 42 approaches its second or cast position as shown in FIG. 5, overcenter spring 118 assumes an overcenter position wherein overcenter spring 118 exerts a counter clockwise force on kick lever 70 thereby urging tooth engaging surface 98 of second post 96 of kick lever 70 between adjacent teeth 28 of ratchet element 26 as shown in FIG. 5.

With this arrangement, the operation of the reel operating mechanism and the actuating mechanism are not significantly affected while preventing the problem of jamming that has occurred in prior art reels of this type.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A fishing reel comprising:
a frame;
a crank shaft mounted to said frame, said crank shaft defining an axis;
a ratchet element on said crank shaft, said ratchet element defining a plurality of teeth;
a kick lever defining a base portion having an upper surface and a tooth engagement surface extending upwardly from said upper surface of said base portion, said tooth engagement surface for selective engagement with one of said plurality of said teeth of said ratchet element;
an attachment member having a length affixed to said frame and slidably engaging said upper surface of said kick lever;
wherein said upper surface of said kick lever slides laterally over said length.

2. The fishing reel according to claim 1 further comprising:
a slider movably affixed to said frame;
a thumb button in communication with said slider for selectively positioning said slider; and wherein
said kick lever has a first end and a second end, said first end of said kick lever in communication with said slider for selectively positioning said kick lever;
said second end of said kick lever defining a tooth engaging post for selective engagement with one of said plurality of teeth on said ratchet element.

3. The fishing reel according to claim 2 wherein:
said kick lever defines a kick lever orifice;
the fishing reel further comprising an overcenter spring received in said kick lever orifice for biasing said kick lever;
wherein said kick lever is movable between an engaged position and a disengaged position with respect to said ratchet element.

4. The fishing reel according to claim 1 wherein:
said kick lever is comprised of a post extending vertically from said base portion;
said tooth engagement surface of said kick lever is defined by a tooth engaging post;
said kick lever further comprises a horizontal reinforcing member extending from said post to said tooth engaging post.

5. The fishing reel according to claim 4 wherein:
said base portion, said post, said tooth engaging post and said horizontal reinforcing member define a window;
said attachment member passes through said window.

6. The fishing reel according to claim 1 further comprising:
an external crank handle affixed to said crank shaft, said external crank handle rotatable about said axis of said crank shaft; and wherein
said ratchet element is keyed to said crank shaft for following rotation of said crank shaft about said axis.

7. A kick lever for selectively engaging a ratchet element in a fishing reel for selectively facilitating a cast state or a retrieve state of said reel, said kick lever comprising:
a base portion having an upper surface;
a tooth engagement surface extending upwardly from said upper surface of said base portion, said tooth engagement surface for selective engagement with the ratchet element;
a post extending vertically from said base portion;
said tooth engagement surface is defined by a tooth engaging post;
a horizontal reinforcing member extending from said post to said tooth engaging post.

8. The kick lever according to claim 7 wherein:
said base portion, said post, said tooth engaging post and said horizontal reinforcing member define a window.

9. The kick lever according to claim 7 wherein:
the kick lever has a first end and a second end, said first end of said kick lever defining a pivot orifice; and
said tooth engaging post on said second end of said kick lever, said tooth engaging post defining said tooth engaging surface.

10. A fishing reel comprising:
a frame;
a crank shaft mounted to said frame, said crank shaft defining an axis;
a ratchet element on said crank shaft, said ratchet element defining a plurality of teeth;
a kick lever defining a base portion having an upper surface and a tooth engagement surface extending upwardly from said upper surface of said base portion, said tooth engagement surface for selective engagement with one of said plurality of said teeth of said ratchet element;
an attachment member affixed to said frame and slidably engaging said upper surface of said kick lever;
a slider movably affixed to said frame;
a thumb button in communication with said slider for selectively positioning said slider; and wherein
said kick lever has a first end and a second end, said first end of said kick lever in communication with said slider for selectively positioning said kick lever;

said second end of said kick lever defining a tooth engaging post for selective engagement with one of said plurality of teeth on said ratchet element;
said kick lever defines a kick lever orifice;
an overcenter spring received in said kick lever orifice for biasing said kick lever;
wherein said kick lever is movable between an engaged position and a disengaged position with respect to said ratchet element;
said kick lever defines a kick lever orifice;
the fishing reel further comprising an overcenter spring received in said kick lever orifice for biasing said kick lever;
wherein said kick lever is movable between an engaged position and a disengaged position with respect to said ratchet element.

11. A fishing reel comprising:
a frame;
a crank shaft mounted to said frame, said crank shaft defining an axis;
a ratchet element on said crank shaft, said ratchet element defining a plurality of teeth;
a kick lever defining a base portion having an upper surface and a tooth engagement surface extending upwardly from said upper surface of said base portion, said tooth engagement surface for selective engagement with one of said plurality of said teeth of said ratchet element;
an attachment member affixed to said frame and slidably engaging said upper surface of said kick lever; wherein
said kick lever is comprised of a post extending vertically from said base portion;
said tooth engagement surface of said kick lever is defined by a tooth engaging post;
said kick lever further comprises a horizontal reinforcing member extending from said post to said tooth engaging post.

12. The fishing reel according to claim 11 wherein:
said base portion, said post, said tooth engaging post and said horizontal reinforcing member define a window;
said attachment member passes through said window.

13. A kick lever for selectively engaging a ratchet element in a fishing reel for selectively facilitating a cast state or a retrieve state of said reel, said kick lever comprising:
a base portion having an upper surface;
a tooth engagement surface extending upwardly from said upper surface of said base portion, said tooth engagement surface for selective engagement with the ratchet element;
a post extending vertically from said base portion;
said tooth engagement surface is defined by a tooth engaging post;
a horizontal reinforcing member extending from said post to said tooth engaging post.

14. The kick lever according to claim 13 wherein:
said base portion, said post, said tooth engaging post and said horizontal reinforcing member define a window.

15. The kick lever according to claim 13 wherein:
the kick lever has a first end and a second end, said first end of said kick lever defining a pivot orifice; and
said tooth engaging post on said second end of said kick lever, said tooth engaging post defining said tooth engaging surface.

* * * * *